(12) United States Patent
Zhang et al.

(10) Patent No.: US 8,594,459 B2
(45) Date of Patent: Nov. 26, 2013

(54) ARRANGING SECONDARY IMAGES ADJACENT TO A PRIMARY IMAGE

(75) Inventors: Xuemei Zhang, Mountain View, CA (US); Clayton Brian Atkins, Mountain View, CA (US); Daniel R. Tretter, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/501,293

(22) PCT Filed: Oct. 30, 2009

(86) PCT No.: PCT/US2009/062797
§ 371 (c)(1),
(2), (4) Date: Apr. 11, 2012

(87) PCT Pub. No.: WO2011/053314
PCT Pub. Date: May 5, 2011

(65) Prior Publication Data
US 2012/0201479 A1    Aug. 9, 2012

(51) Int. Cl.
*G06K 9/36* (2006.01)
(52) U.S. Cl.
USPC .......................................................... 382/284
(58) Field of Classification Search
USPC .................. 382/284, 293, 294, 306, 100, 180
See application file for complete search history.

(56) References Cited

U.S. PATENT DOCUMENTS

| 7,689,064 | B2* | 3/2010 | Miksovsky et al. | 382/294 |
| 7,760,956 | B2* | 7/2010 | Lin et al. | 382/254 |
| 2004/0148572 | A1 | 7/2004 | Nakanishi et al. | |
| 2004/0207875 | A1* | 10/2004 | Endo | 358/1.18 |
| 2005/0068583 | A1 | 3/2005 | Gutkowski et al. | |
| 2005/0149889 | A1* | 7/2005 | Messerman et al. | 716/3 |
| 2009/0146994 | A1 | 6/2009 | Goh | |

FOREIGN PATENT DOCUMENTS

KR    10-2008-0053930    6/2008

* cited by examiner

*Primary Examiner* — Yon Couso (57) ABSTRACT

A method includes determining a target layout in which secondary images (504) are placed along an edge (506, 508) of a primary image (502), dividing each of the secondary images (504) into one of a horizontal group and a vertical group according to the target layout and dimensions of each of the secondary images (504), dividing any of the secondary images (504) in the horizontal group into one of a top group (706) and a bottom group (708) according to the target layout and a width of each of the secondary images (504) in the horizontal group, dividing any of the secondary images (504) of the vertical group into one of a left group and a right group according to the target layout and a height of each of the secondary images (504) in the vertical group, and placing each of the secondary images (504) adjacent to an edge (506, 508) of the primary image (502) according to an assigned group of each secondary image (504).

17 Claims, 9 Drawing Sheets

ARRANGING SECONDARY IMAGES ADJACENT TO A PRIMARY IMAGE

BACKGROUND

Great strides have been made in the last several decades in the realms of data processing and storage. As a result of this increased processing and storage capacity, the use of digital media has sizably increased for both individuals and organizations. The ubiquity of digital media in modern society has increased demand for media organization and presentation solutions.

Some types of software allow a user to organize a group of digital images according to a desired layout. For example, a user may use software to create a page layout having a central image and various secondary images arranged according to a desired configuration with respect to the central image. Nevertheless, achieving a satisfactory result with such a layout may require the user to resize the images to be used in the layout and to manually arrange the images according to the desired configuration. These tasks may be difficult and/or time consuming for the user, especially if the secondary images used are not of a uniform size or orientation.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Image layout software allows users to design and create layouts for images such as photos, artwork and text blocks. In certain image layout programs, a user is able to place several smaller images around a larger image. The larger image, which may be referred to as the primary image, may present the main subject of a layout. The smaller images, which may be referred to as secondary images, may present various aspects of the main subject of a layout. The process of manually laying out secondary images around a primary image can be a difficult and/or time consuming task. For example, a user may spend a significant amount of time adjusting the size and position of several images on a single page in order to find an aesthetically acceptable arrangement.

Some types of image layout software provide a set of templates that allow a user to place a set number of secondary images around a primary image. Although such templates may save a user some time over purely manual solutions, they are often inflexible or limiting with regard to the number and location of images that may be placed on the page. Additionally many templates limit the aspect ratio of images used therewith, thereby forcing the user to crop a noncompliant image in order to make it fit a predefined location on a page.

In light of the above considerations, the present specification relates to systems and method for producing a layout of secondary images arranged adjacent to a primary image. For example, one such layout may include secondary images placed completely around a primary image with the secondary images being oriented either vertically or horizontally with respect to the primary image.

According to one illustrative embodiment, a target layout may be determined. The target layout may specify the manner in which the secondary images are to be placed around the primary image. The set of secondary images may be divided into a horizontal group and a vertical group according to the target layout. Some target layouts may specify that secondary images are placed only along vertical edges, in which case the secondary images are all placed into the vertical group while the horizontal group remains empty. The horizontal group may be further divided into a top group and a bottom group according to the target layout. Likewise, the vertical group may be further divided up into a left group and a right group according to the target layout. The secondary images may then be placed along an edge of the primary image according to their assigned groups.

An image layout system embodying principles described herein may provide a user with a dynamic way of arranging secondary images around a primary image. The methods and systems described herein may work with a range of secondary image counts. In addition, a low computational load is exhibited as most calculations are performed on one dimension of an image.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Throughout this specification and in the appended claims, the term "image layout system" is to be broadly interpreted as a physical computing system including a processor, memory, and a user interface capable of arranging images on a page and displaying the arrangement to a user.

Throughout this specification and in the appended claims, the term "image" may refer to any visual representation, including, but not limited to, photographs, artwork, text, and combinations thereof. The term "primary image" is to be broadly interpreted as a main or central image within a layout. The term "secondary image" is to be broadly interpreted as any image within a layout which is not the primary image.

Throughout this specification and in the appended claims, a "border" may refer to the region around a primary image where secondary images are placed. A border may be given a "thickness" which may refer to the height of secondary images placed above or below a primary images and a width of secondary images placed to the left or to the right of a primary image.

Figure 1:
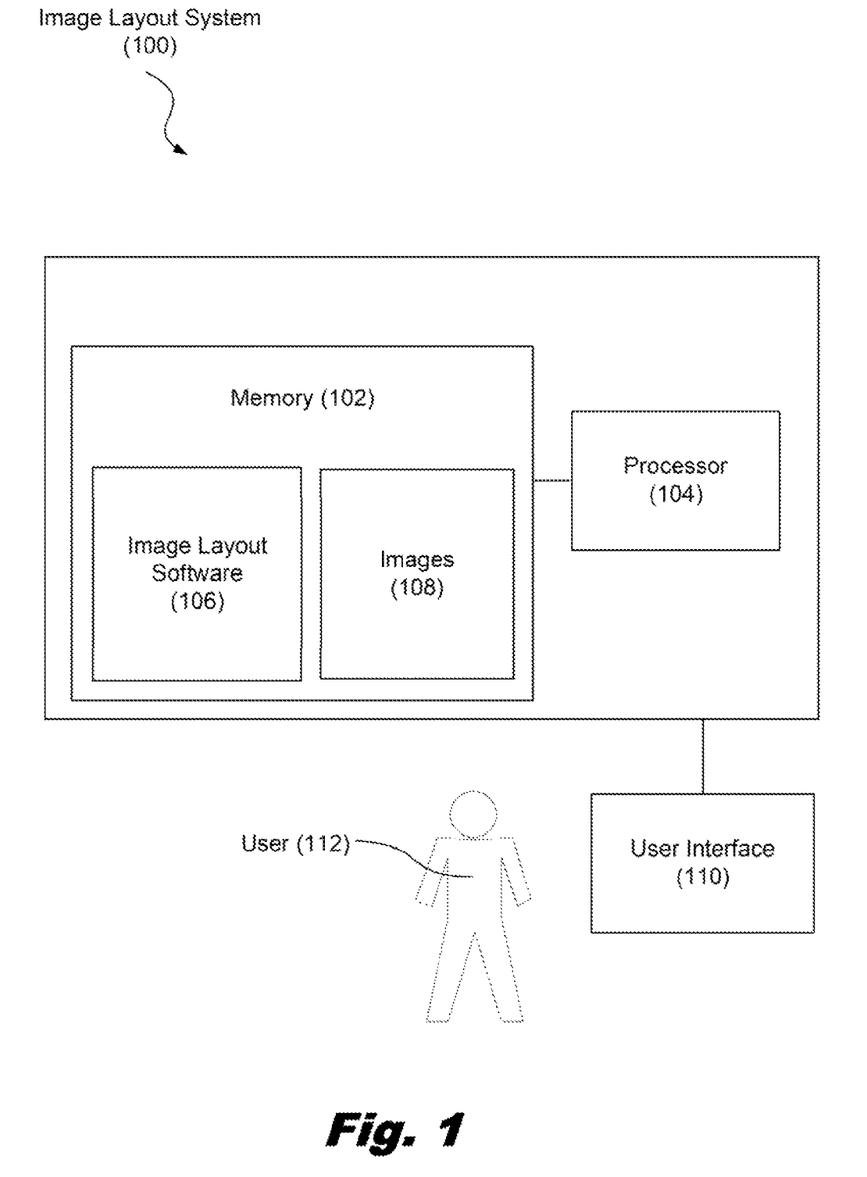
FIG. 1 is a diagram showing an illustrative image layout system capable of placing a number of secondary images with a primary image, according to one embodiment of principles described herein.

Referring now to the figures, FIG. 1 is a diagram showing an illustrative image layout system (100). According to one illustrative embodiment, an image layout system may include a processor (104), a user interface (110), and a memory (102) having image layout software (106) and a number of images (108) stored thereon.

The image layout system (100) may be embodied as any physical computing device or combination of physical computing devices that may suit particular application of the principles described herein. For example, the image layout system (100) may be embodied by, but is not limited to, any of a laptop computer, a desktop computer, a server, and a Personal Digital Assistant (PDA). The memory (102) of the image layout system (100) may include, but is not limited to, a magnetic disk drive, a solid state drive, volatile solid-state memory, and/or an optical disc drive.

The image layout software (106) stored by the memory (102) may be embodied as computer readable code configured to cause the processor (104) to execute various instructions related to the layout of individual images (108) on a page.

An image (108) may be any type of image including, but not limited to, a photo, a text block, or a piece of artwork. A collection of images (108) may include images imported from another memory medium as well as images designed and/or created with the image layout system (100).

The user interface (110) may enable interaction between the image layout system (100) and a user (112). The user interface (110) may include a display device as well as an input receiving device such as a keyboard or a mouse. Through the user interface (110), a user (112) is able to send commands to the image layout system (100). These commands may involve the layout of images (108). Information about images (108) and their layout may be presented to the user (112) through the display device.

Figure 2:
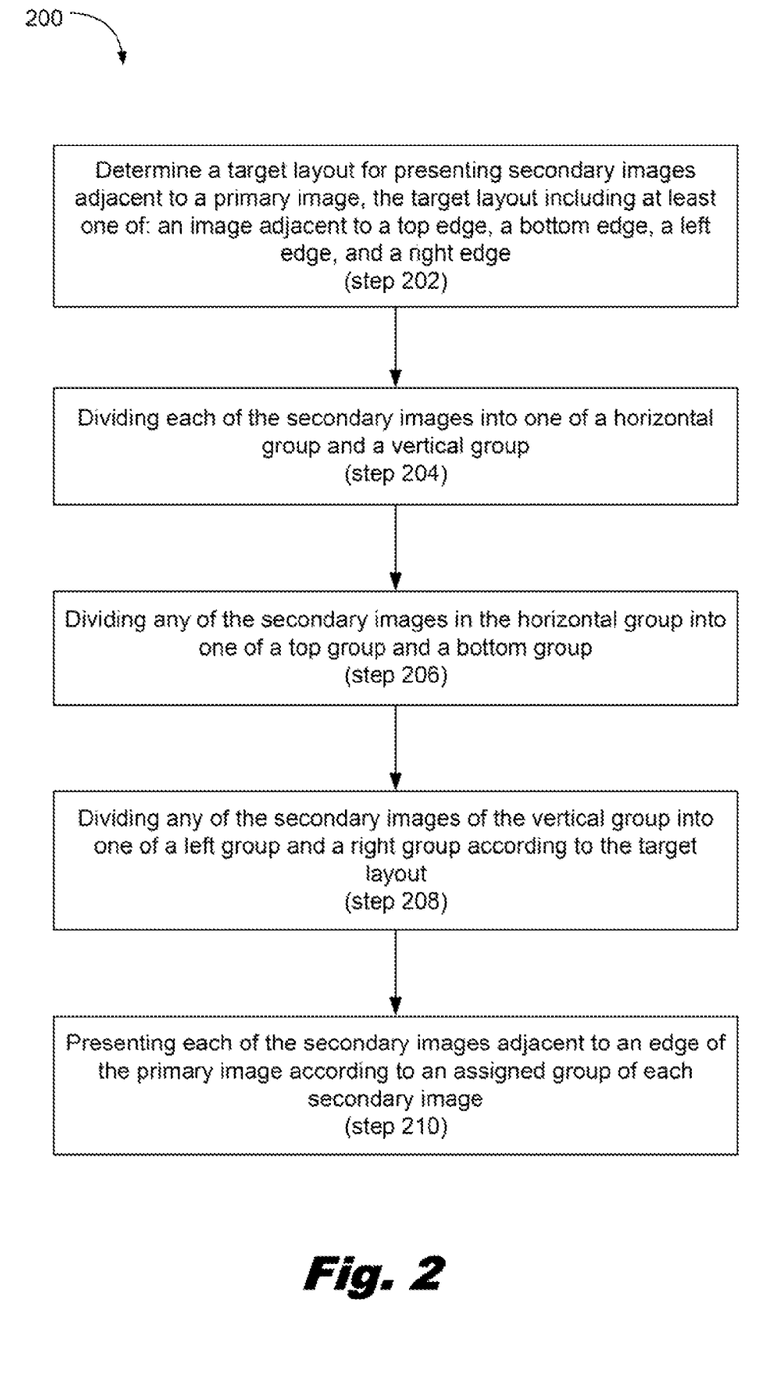
FIG. 2 is a flowchart showing an illustrative method for arranging secondary images adjacent to a primary image, according to one embodiment of principles described herein.

FIG. 2 is a flowchart showing an illustrative method (200) for arranging secondary images adjacent to a primary image. According to one illustrative embodiment, a user may select a target layout. A set of secondary images may then be divided up into groups according to the target layout selected by the user. The secondary images may then be placed to an edge of the primary image according to their assigned group.

To determine (step 202) a target layout, a user may select a particular layout from a list of possible layouts. In some embodiments, a number of candidate target layouts may be generated and a user may cycle through them to select a desired layout. A target layout may specify how a number of secondary images are arranged adjacently to a primary image. For example, a target layout may specify that the secondary images only be placed along only one of any side of the primary image. In a further example, secondary images may be placed entirely around the primary image. More examples of target layouts will be discussed below in correlation with FIG. 8.

The set of secondary images to be placed adjacently to the primary image may be divided (step 204) into a horizontal group and a vertical group. The manner in which the division occurs may depend on the target layout. For example, if the secondary images are only to be placed along vertical edges of a primary image, then each secondary image will be placed into the vertical group and no secondary images will be placed in the horizontal group. In a further example, if the secondary images are to be placed all around the primary image, then the secondary images will be placed into both groups. The ratio of the heights of the images in the vertical group to the widths of the secondary images in the vertical group may depend on the selected target layout. Examples of ways to divide the secondary images into a horizontal group and a vertical group will be discussed in more detail below in correlation with FIG. 5 and FIG. 6.

The horizontal group may be further divided (step 206) up into a top group and a bottom group. If the target layout specifies images to be placed along only one of the top or bottom group, any of the secondary images in the horizontal group may be placed into only one of the groups. For example, if the target layout specifies that secondary images are to be placed along the bottom edge of a primary image and not the top edge, then each secondary image in the horizontal group may be placed into the bottom group while the top group remains empty.

Figure 7A:
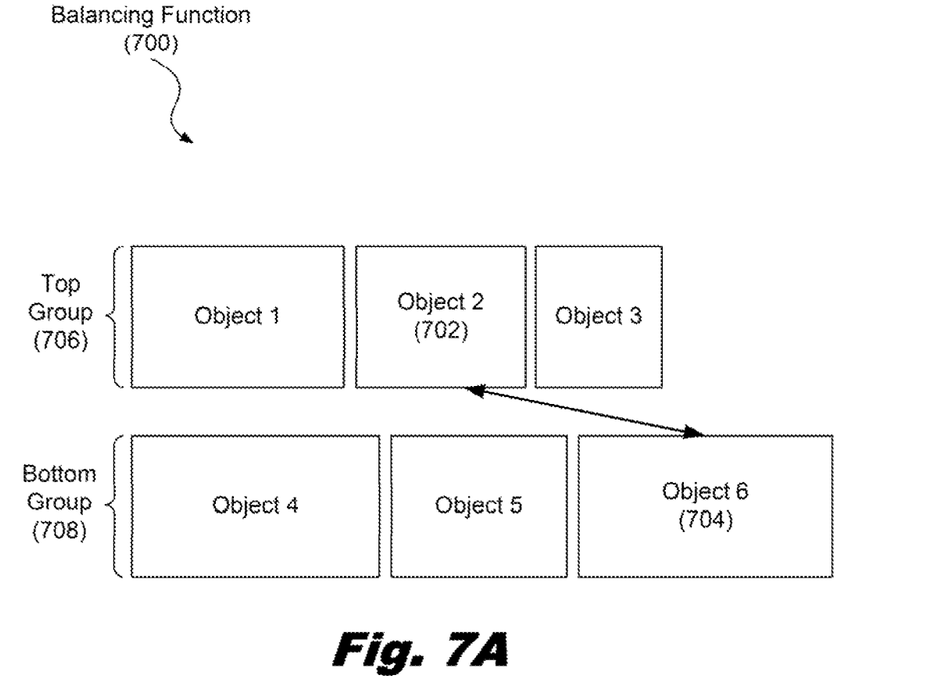
FIGS. 7A and 7B are diagrams showing an illustrative method for balancing the total lengths of two groups of secondary images, according to one embodiment of principles described herein.
Figure 7B:
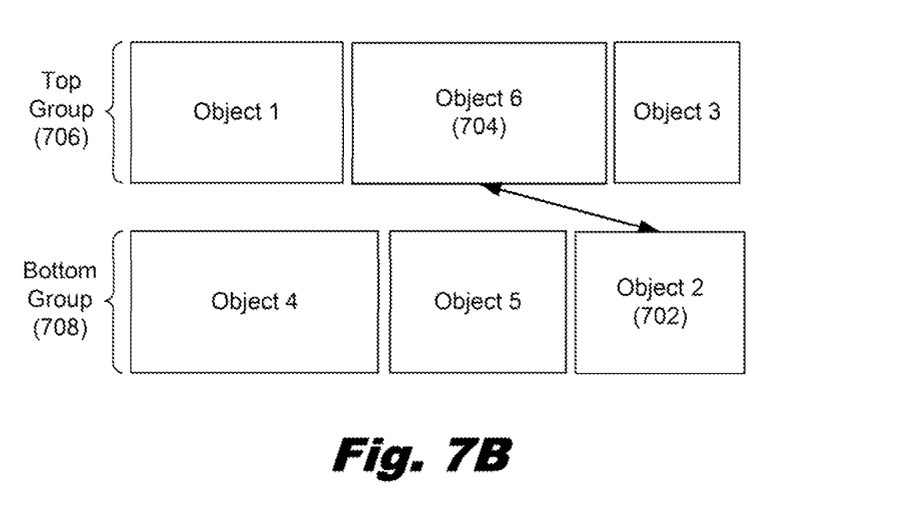

The vertical group may be further divided (step 208) up into a left group and a right group. If the target layout specifies images to be placed along only one of the right or left groups, any of the secondary images in the vertical group may be placed into only one of the groups. For example, if the target layout specifies that secondary images are to be placed along the right edge of a primary image and not the left edge, then each secondary image in the vertical group may be placed into the right group while the left group remains empty. More details on the process of further dividing horizontal or vertical groups will be discussed below in correlation with FIG. 7.

After each of the secondary images has been assigned to an appropriate group, they may be placed according to their assigned groups. For example, if there are any images in the left group, they will be placed along the left edge of the primary image. Each image will be placed along an edge of the primary image according to its assigned group.

The exact dimensions of the primary image and secondary images may then be adjusted for a more appropriate fit. A function may also be applied to determine which order the secondary images are placed along their assigned edges.

In one embodiment, the image layout system (300) may be configured to normalize each of the secondary images. In this case, the dimensions of the secondary images will be scaled so that they all have the same area. The exact area they are given may depend on a variety of factors including, but not limited to, the overall layout dimensions, the primary image dimensions, and user selection.

Figure 3:
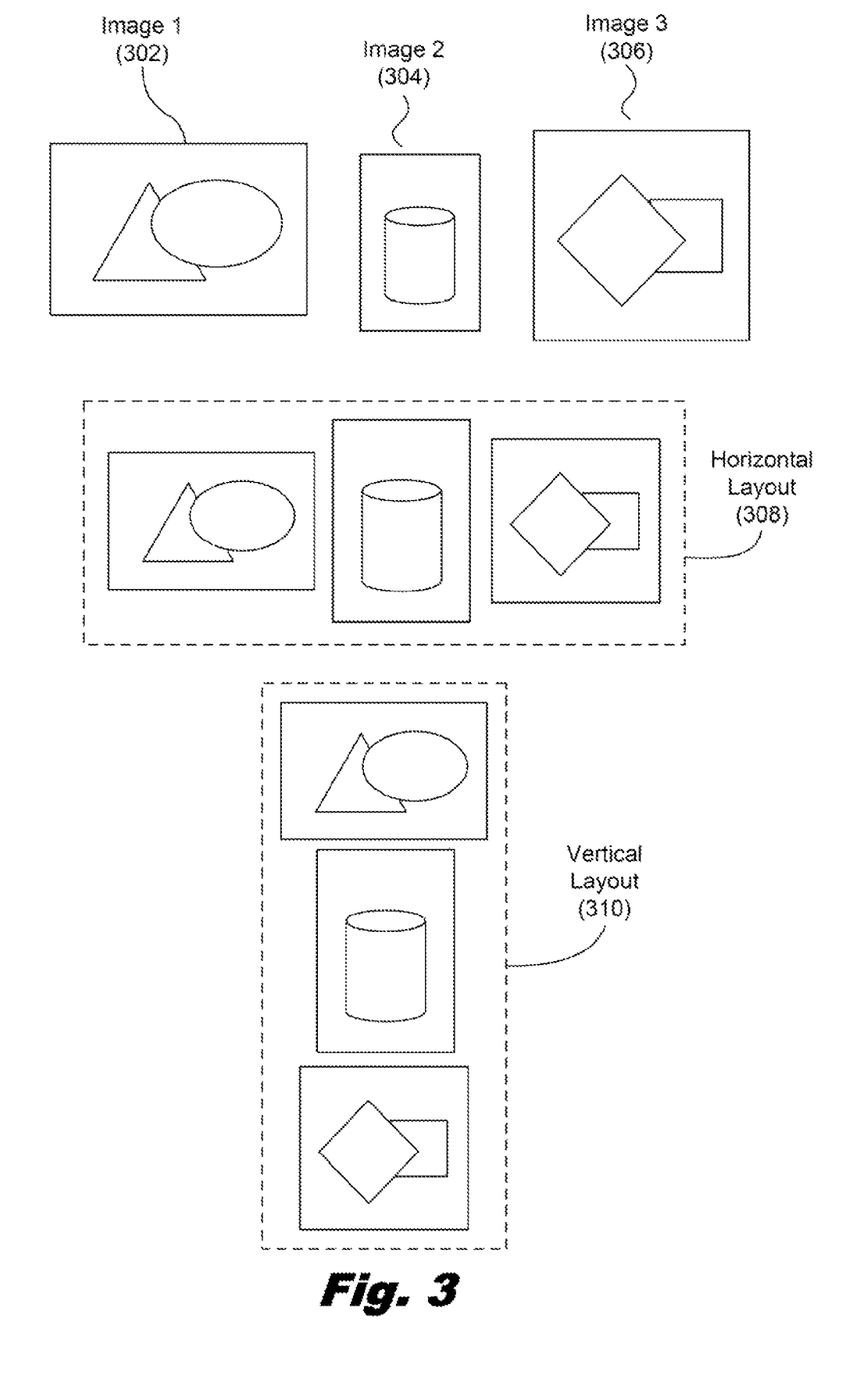
FIG. 3 is a diagram showing an illustrative method for adjusting sizes of secondary images, according to one embodiment of principles described herein.

FIG. 3 is a diagram showing an illustrative method for adjusting sizes of secondary images (302, 304, 306). According to one illustrative embodiment, a set of secondary images (302, 304, 306) may have a normalized area. The secondary images may then be used as part of a horizontal layout (308) or a vertical layout (310).

In one embodiment, the secondary images which have been selected by a user to be placed around a primary image may be normalized to a specific area. In this case, the height and width of each secondary image will be adjusted while maintaining the aspect ratio. Generally, each secondary image may have a different height or width.

At the top of FIG. 3, three illustrative secondary images (302, 304, 306) are shown with their initial relative dimensions. These images (302, 304, 306) may then be scaled so that they all exhibit the same area. If the images (302, 304, 306) are placed into a horizontal group, they may be arranged in a horizontal layout (308) as shown in the middle of FIG. 3. If the images (302, 304, 306) are placed into a vertical group, they may be arranged in a vertical layout (310) as shown at the bottom of FIG. 3.

Figure 4:
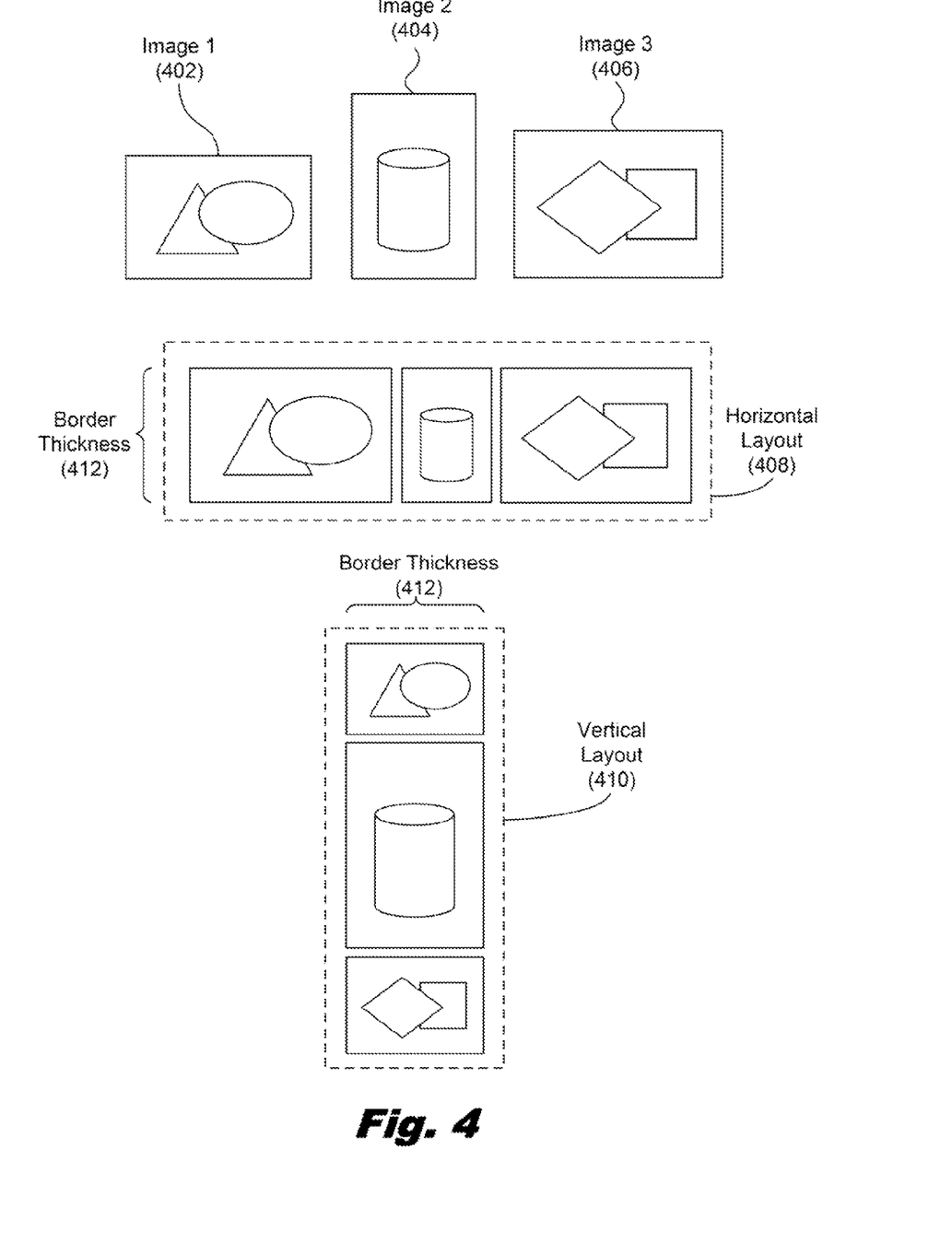
FIG. 4 is a diagram showing an illustrative method for adjusting sizes of secondary images, according to one embodiment of principles described herein.

In one embodiment, the secondary images may be scaled so that they each have the same height or width. In this embodiment, a border thickness may be determined. The secondary images placed horizontally along the primary image may be scaled so that their heights match the border thickness. Likewise, the secondary images placed vertically along the primary image may be scaled so that their widths match the border thickness.

FIG. 4 is a diagram showing an illustrative method for adjusting sizes of secondary images to match a border thickness. According to one illustrative embodiment, a set of secondary images (402, 404, 406) may be placed into a horizontal layout (408) or a vertical layout (410).

In one embodiment, the graphic image layout system may be configured to scale each of the secondary images to fit within an assigned border thickness. The border thickness does not need to be the same for each portion of the border. For example, the top border may be slightly thicker than the bottom border. Likewise, the right border may be slightly thinner than the left border.

At the top of FIG. 4, three illustrative secondary images (402, 404, 406) are shown with their initial relative dimensions. These images (402, 404, 406) may then be scaled so that they have a matching dimension. If the images (402, 404, 406) are placed into a horizontal group, they may be arranged in a horizontal layout (408) and be scaled so that they have matching heights as shown in the middle of FIG. 4. If the images (402, 404, 406) are placed into a vertical group, they may be arranged in a vertical layout (410) and be scaled so that they have matching widths as shown at the bottom of FIG. 4.

Figure 5:
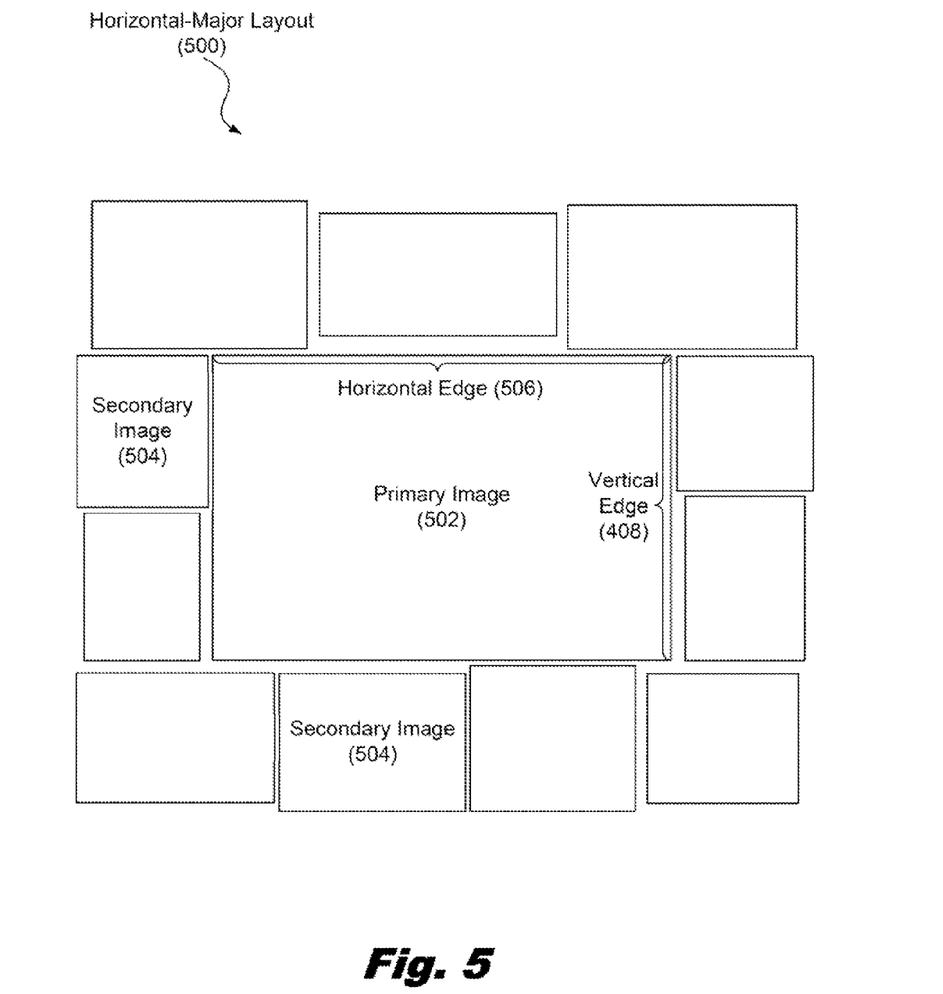
FIG. 5 is a diagram showing an illustrative layout of secondary images with a primary image in a horizontal-major arrangement, according to is one embodiment of principles described herein.

FIG. 5 is a diagram showing an illustrative layout of secondary images with a primary image in a horizontal-major arrangement. Additionally, FIG. 5 shows an embodiment in which the secondary images have been normalized. According to one embodiment, secondary images (504) from a horizontal group are placed along a horizontal edge (506) of the primary image (502) and secondary images (504) from a vertical group are placed along a vertical edge (508) of the primary image (502).

A horizontal-major layout (500) is one in which the secondary images (504) placed horizontally along the primary image (502) extend past the primary image (502) and are placed horizontally above or below the vertically placed secondary images (504). When a horizontal-major layout is used, the image layout system may divide the secondary images between the horizontal group and the vertical group so that the ratio of the total width of the horizontal group to the total height of the vertical group is similar to the ratio of the width of the primary image plus the border widths on the sides to the height of the primary image (502). If the secondary images (504) have been normalized as shown in FIG. 5, the border widths on both the left and the right side may depend on the widths of the secondary images (504) contained therein. Because the widths of the normalized secondary images (504) may vary, the image layout system may be configured to use the width of the widest vertically placed secondary image (504) as the border width.

As mentioned above, the horizontal group may be further divided into a top group and a bottom group. The secondary images (504) in the top group may be placed along the top horizontal edge (506) of the primary image (502) and the secondary images (504) in the bottom group may be placed along the bottom horizontal edge (506) of the primary image (502). Likewise, the vertical group may be further divided into a left group and a right group. The secondary images (504) in the left group may be placed along the left vertical edge (508) of the primary image (502) and the secondary images (504) in the right group may be placed along the right vertical edge (408) of the primary image (502).

The total length of the secondary images (504) in the top group may not precisely match the total length of the secondary images (504) in the bottom group. Likewise, the total height of the secondary images (504) in the left group may not precisely match the total length of the secondary images (504) in the right group. The spacing between secondary images (504) may be adjusted to account for slight differences in total length. For example, if the total length of the top group is smaller than the total length of the bottom group. The spacing between the secondary images (504) in the top group may be increased so that the total length plus spacing of the top group is equal to the total length plus spacing of the bottom group.

Figure 6:
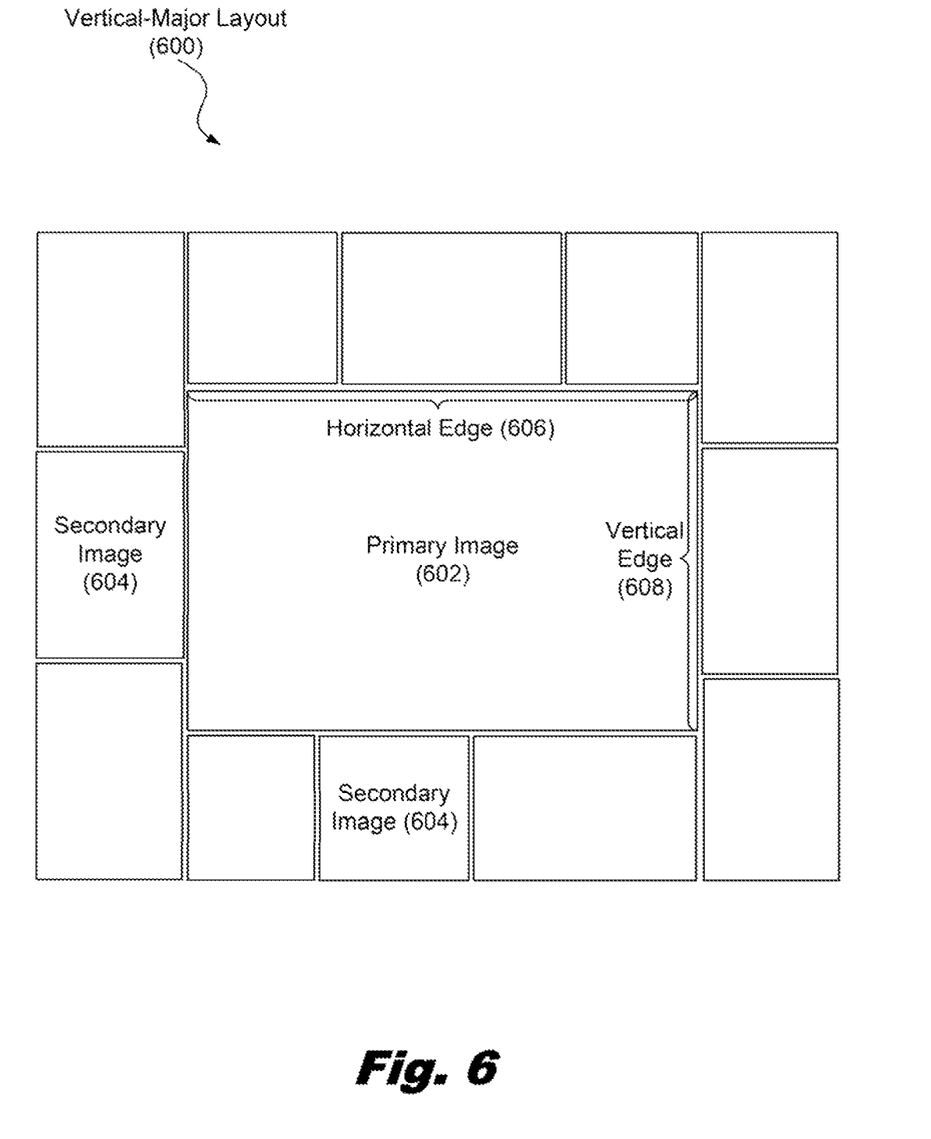
FIG. 6 is a diagram showing an illustrative layout of secondary images with a primary image in a vertical-major arrangement, according to one embodiment of principles described herein.

FIG. 6 is a diagram showing an illustrative layout of secondary images with a primary image in a vertical-major arrangement. Additionally, FIG. 6 illustrates a layout in which the secondary images have been scaled to match a border thickness. According to one embodiment, secondary images (604) from a horizontal group are placed along a horizontal edge (606) of the primary image (602) and secondary images (604) from a group are placed along a vertical edge (608) of the primary image (602).

A vertical-major layout is one in which the secondary images (604) placed vertically along the primary image (602) extend past the primary image (602) and are placed vertically along the horizontally placed secondary images (604). When a vertical-major layout (600) is used, the image layout system may divide the secondary images between the horizontal group and the vertical group so that the ratio of the total width of the horizontal group to the total height of the vertical group is similar to the ratio of the width of the primary image to the height of the primary image (602) plus the border widths both above and below the primary image (602). The secondary images (604) may be scaled to match a specific border width as shown in FIG. 6.

In one embodiment, the image layout system may be configured to prefer the placement of landscape shaped secondary images (604) into a horizontal group and portrait shaped images into a vertical group. In some embodiments, the choice between a horizontal-major layout and a vertical-major layout may depend on the ratio of portrait shaped secondary images (604) to landscape shaped secondary images (604). For example, if there are more portrait shaped secondary images (604) than landscape shaped images (604), it may be preferable to use a vertical-major layout. Conversely, if there are more landscape shaped secondary images (604) than there are portrait shaped secondary images (604), it may be preferable to use a horizontal-major layout.

In one embodiment, the order in which secondary images (604) are placed along their assigned edges may be random. In some embodiments, an ordering function may be applied to place the secondary images (604) in a diverse order. An ordering function may be configured to avoid placing secondary images (604) with similar aspect ratios adjacent to each other. For example, portrait shaped images may be placed between landscape shaped images and vice versa.

As mentioned above, the spacing between the secondary images (604) may be adjusted so that the top and bottom groups have similar lengths. To reduce the amount of spacing which may need to be used, a top and bottom group may be divided so as to minimize the difference in total widths. Likewise, a left and right group may be divided so as to minimize the difference in total height between both groups.

FIG. 7 is a diagram showing an illustrative method for balancing the total lengths of two groups of secondary images. According to one illustrative embodiment, a horizontal group or a vertical group may be further divided into two groups. For example, the horizontal group may be divided into a top group (706) and a bottom group (708). A balancing function (700) may then be applied to make the lengths of the two groups relatively similar. This balancing function may be used to divide the initial collection of secondary images into a horizontal group and a vertical group. The function may also be used to divide the resulting horizontal group into top and bottom groups if required by the target layout or to divide the resulting vertical group into left and right groups if required by the target layout.

In one embodiment, an initial division of a horizontal group may be applied. A balancing function (700) may then be used to transfer images between a top group (706) and a bottom group (708). For example, FIG. 7A shows an initial division of secondary images between a top group (706) and a bottom group (708). The total width of the top group (706) is substantially smaller than the total width of the bottom group (708). The balancing function (700) may determine that the best way to balance the total widths of both groups (706, 708) would be to swap object 2 (702) with object 6 (704). FIG. 7B shows the division of secondary images between a top group (706) and a bottom group (708) after a swap. The top group (706) is now similar in total width to the bottom group (708).

In one embodiment, a set of candidate divisions of a horizontal group may be generated. The total widths of both the top group (706) and the bottom group (708) may be compared. The candidate division having the minimal difference in total width between the top group (706) and the bottom group (708) may be selected.

The same principles described above for balancing the total widths of a bottom group (708) and a top group (706) may apply to balancing a left group and a right group. A balancing function (700) may be applied so that a left group has a total height similar to that of a right group.

FIG. 8 is a diagram showing illustrative layouts for secondary images placed with a primary image. As mentioned above, in some embodiments, the secondary images (804) do not completely surround the primary image (802).

Figure 8A:
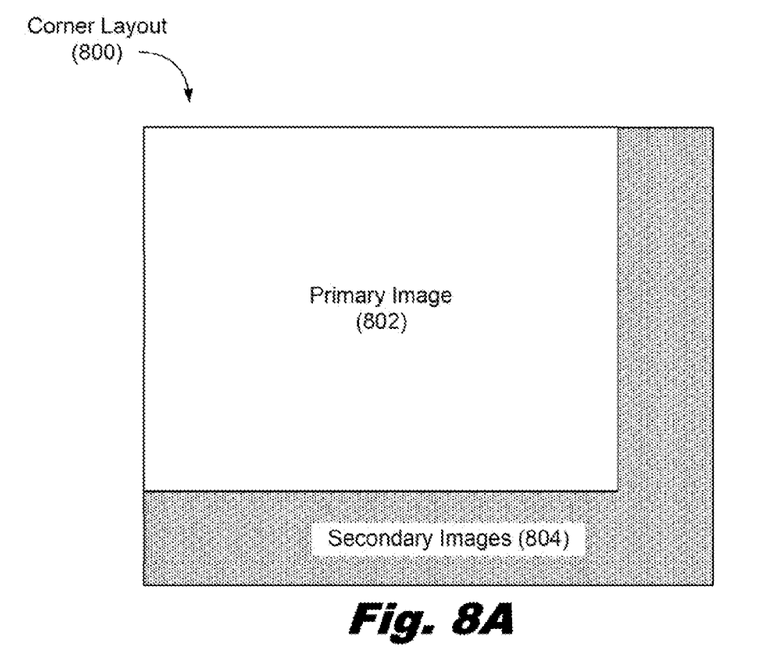
FIGS. 8A-8D are diagrams showing illustrative layouts for secondary images placed with a primary image, according to one embodiment of principles described herein.

FIG. 8A shows an illustrative corner layout (800) in which the primary image (802) is placed in the top right corner and the secondary images (804) are along the bottom horizontal edge and the right vertical edge only. In such a layout, both the vertical group and the horizontal group need not be further divided into two groups. The secondary images (804) may be placed in either a horizontal-major order or a vertical major order. In a horizontal major order, the secondary images (804) placed along the bottom edge of the primary image (802) extend past the right edge of the primary image (802) to be placed beneath the vertically placed secondary images (804). In a vertical-major order, the secondary images (804) on the right side of the primary image (802) extend below the primary image (802) and are placed on the right side of the horizontally placed secondary images (804). A corner layout may be presented with the primary image (802) placed in any of the four corners of the full layout.

Figure 8B:
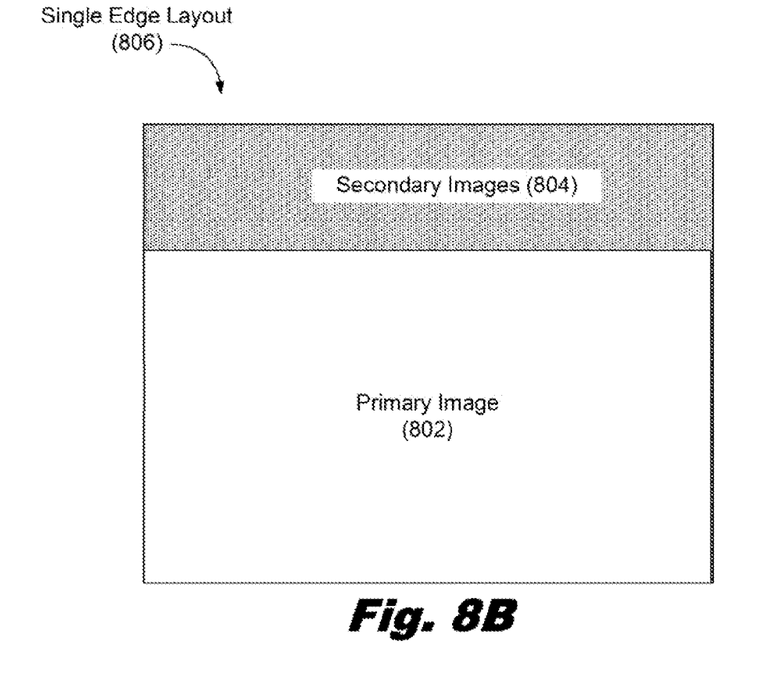

FIG. 8B shows a single edge layout (806) in which the secondary images (804) are placed on only one side of the primary image (802). This layout may be more practical when the number of secondary images (804) is relatively small. A single edge layout (806) may have the secondary images (804) placed solely on any of the four edges of a primary image (802). In the case of a single edge layout (806), each of the secondary images (804) may be placed into either a vertical group or a horizontal group, depending on which edge they are to be placed.

Figure 8C:
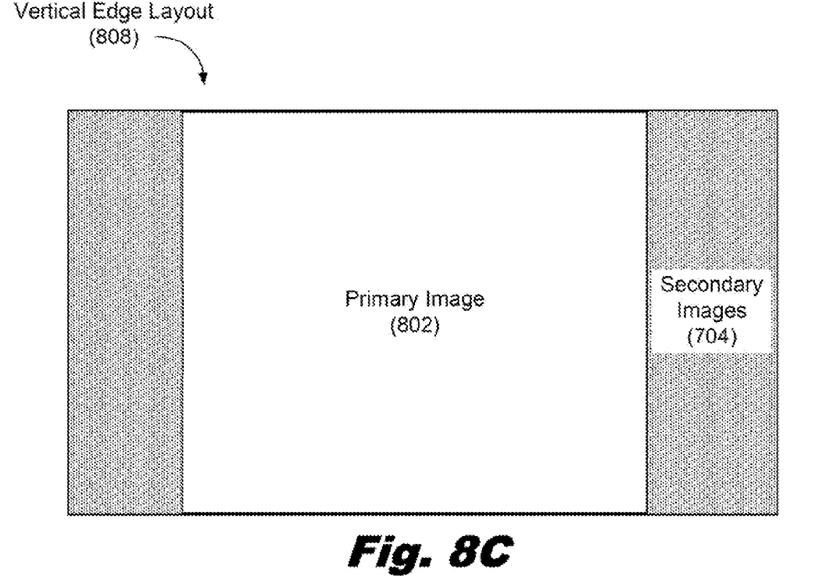

FIG. 8C shows a vertical edge layout (808) in which each of the secondary images (804) are arranged adjacent to both vertical edges of a primary image (802). This layout may be preferred if a majority of the secondary images (804) have portrait shaped dimensions. This layout may be represented by a division between horizontal and vertical groups in which each of the secondary images (804) are placed into the vertical group. The vertical group may then be further divided into a left group and a right group. A balancing function may then be applied to balance the heights of each group.

Figure 8D:
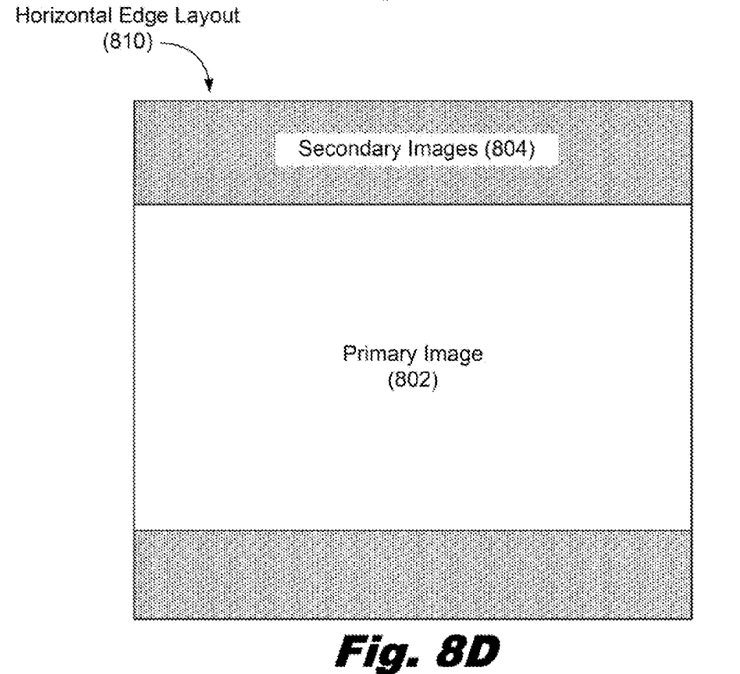

FIG. 8D shows a horizontal edge layout (810) in which secondary images (804) are arranged adjacent to both horizontal edges of a primary image (802). This layout may be preferred if a majority of the secondary images (804) have landscape shaped dimensions. This layout may be represented by a division between horizontal and vertical groups in which each of the secondary images (804) are placed into a horizontal group. The horizontal group may then be further divided into a top group and a bottom group. A balancing function may then be applied to balance the widths of each group.

After a final layout is presented, a user may wish to manually make changes. For example, a user may wish to add an image. In this case, the process may be repeated with the additional image added to a secondary image. The user may also wish to swap images. For example, a user may wish a particular image from the top group to be switched with an image in the bottom group. The spacing between images may be adjusted after the swap so that the total width of the top group matches the total width of the bottom group. In addition, a user may manually adjust the ordering of the secondary images. Switching the order may not necessitate repeating the whole process of determining a layout for a set of secondary images adjacent to a primary image.

In one embodiment, the dimensions of the area of the primary image may grow or shrink while maintaining its aspect ratio. The dimensions and spacing of each of the secondary images may be adjusted accordingly. If the primary image increases in area, the secondary images may have to be reduced in area. Conversely, if the primary image is decreased in area, the area of the secondary images may be increased.

In sum, to provide a layout of images in which a number of secondary images are placed adjacent to a primary image, a target layout is determined. A set of secondary images may then be divided up between a horizontal group and a vertical group according to the target layout. The horizontal group may be divided into a top and bottom group and the vertical group may be further divided into a left group and a right group according to the target layout. The secondary images from the horizontal group may then be placed along a horizontal edge of the primary image and the secondary images from the vertical group may be placed along a vertical edge of the primary image.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method performed by a physical computing system for arranging a number of secondary images adjacent to a primary image, the method comprising:
   with a processor, determining a target layout in which said secondary images are placed along at least one edge of said primary image;
   with the processor, dividing each of said secondary images into one of a horizontal group and a vertical group according to said target layout and dimensions of each of said secondary images;
   with the processor, dividing any of said secondary images in said horizontal group into one of a top group and a bottom group according to said target layout and a width of each of said secondary images in said horizontal group;
   with the processor, dividing any of said secondary images of said vertical group into one of a left group and a right group according to said target layout and a height of each of said secondary images in said vertical group; and
   with the processor, placing each of said secondary images adjacent to an edge of said primary image according to an assigned group of each said secondary image.

2. The method of claim 1, in which said target layout dictates that a ratio of a total height of said secondary images in said vertical group to a total width of said secondary images in said horizontal group be similar to a ratio of a height of said primary image to a width of said primary image plus a width of a secondary image within said vertical group.

3. The method of claim 1, in which said target layout dictates that a ratio of a total height of said secondary images in said vertical group to a total width of said secondary images in said horizontal group be similar to a ratio of a height of said primary image plus a height of a secondary image within said horizontal group to a width of said primary image.

4. The method of any of claims 1-3, further comprising applying a balancing function to cause a total width of said secondary images in said top group to be similar to a total width of said secondary images in said bottom group.

5. The method of claim 1, further comprising, applying a balancing function to cause a total height of said secondary images in said left group to be similar to a total height of said secondary images in said right group.

6. The method of claim 1, further comprising normalizing an area of said secondary images.

7. The method of claim 1, further comprising:
   adjusting dimensions of said primary image; and
   adjusting dimensions of each of said secondary images to match said dimensions of said primary image.

8. The method of claim 1, in which dividing each of said secondary images into one of a horizontal group and a vertical group further comprises giving preference for a secondary image having portrait dimensions to said vertical group and giving preference for a secondary image having landscape dimensions to said horizontal group.

9. The method of claim 1, further comprising ordering a placement of said secondary images along said primary image such that any of said secondary images comprising similar aspect ratios are distributed evenly across an edge of said primary image.

10. A computing system comprising:
    a processor; and
    a memory communicatively coupled to said processor and having image layout software stored thereon;
    in which said image layout software is configured to, upon execution of said software to cause said processor to:
       determine a target layout in which said secondary images are placed along at least one edge of said primary image;
       divide each of said secondary images into one of a horizontal group and a vertical group according to said target layout and dimensions of each of said secondary images;
       divide any of said secondary images in said horizontal group into one of a top group and a bottom group according to said target layout and a width of each of said secondary images in said horizontal group;
       divide any of said secondary images of said vertical group into one of a left group and a right group according to said target layout and a height of each of said secondary images in said vertical group; and
       place each of said secondary images adjacent to an edge of said primary image according to an assigned group of each said secondary image.

11. The computing system of claim 10, in which said target layout dictates that a ratio of a total height of said secondary images in said vertical group to a total width of said secondary images in said horizontal group be similar to a ratio of a height of said primary image to a width of said primary image plus a width of a secondary image within said vertical group.

12. The computing system of claim 10, in which said target layout dictates that a ratio of a total height of said secondary images in said vertical group to a total width of said secondary images in said horizontal group be similar to a ratio of a height of said primary image plus a height of a secondary image within said horizontal group to a width of said primary image.

13. The computing system of any of claims 10-12, in which said processor is further configured to apply a balancing function to cause a total width of said secondary images in said top group to be similar to a total width of said secondary images in said bottom group.

14. The computing system of claim 10, in which said processor is further configured to apply a balancing function to cause a total height of said secondary images in said left group to be similar to a total height of said secondary images in said right group.

15. A computer program product for providing a layout for images, said computer program product comprising:
    a computer readable storage medium having computer readable code embodied therewith, said computer readable program code comprising:
    computer readable program code configured to:
       determine a target layout in which said secondary images are placed along at least one edge of said primary image;
       divide each of said secondary images into one of a horizontal group and a vertical group according to said target layout and dimensions of each of said secondary images;
       divide any of said secondary images in said horizontal group into one of a top group and a bottom group according to said target layout and a width of each of said secondary images in said horizontal group;
       divide any of said secondary images of said vertical group into one of a left group and a right group according to said target layout and a height of each of said secondary images in said vertical group; and place each of said secondary images adjacent to an edge of said primary image according to an assigned group of each said secondary image.

16. The computer program product of claim 15, further comprising computer readable program code configured to determine an order the secondary images are to be placed along the edge of the primary image.

17. The computer program product of claim 16, in which computer readable program code configured to determine an order the secondary images are to be placed along the edge of the primary image is configured to avoid placing secondary images with similar aspect ratios adjacent to each other.

* * * * *

UNITED STATES PATENT AND TRADEMARK OFFICE
CERTIFICATE OF CORRECTION

PATENT NO.        : 8,594,459 B2  
APPLICATION NO.   : 13/501293  
DATED             : November 26, 2013  
INVENTOR(S)       : Xuemei Zhang et al.

Page 1 of 1

It is certified that error appears in the above-identified patent and that said Letters Patent is hereby corrected as shown below:

In the Claims

In column 10, line 6, in Claim 10, delete "software" and insert -- software, --, therefor.

In column 11, line 6, in Claim 16, delete "order" and insert -- order of --, therefor.

In column 11, line 10, in Claim 17, delete "order" and insert -- order of --, therefor.

Signed and Sealed this  
Fourth Day of March, 2014

Michelle K. Lee  
*Deputy Director of the United States Patent and Trademark Office*